United States Patent
Killamsetti et al.

(10) Patent No.: US 10,956,079 B2
(45) Date of Patent: Mar. 23, 2021

(54) DATA RESYNCHRONIZATION

(71) Applicant: HEWLETT PACKARD ENTERPRISE DEVELOPMENT LP, Houston, TX (US)

(72) Inventors: Praveen Killamsetti, Milpitas, CA (US); Tomasz Barszczak, Palo Alto, CA (US); Monil Sanghavi, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 368 days.

(21) Appl. No.: 15/952,780

(22) Filed: Apr. 13, 2018

(65) Prior Publication Data

US 2019/0317667 A1   Oct. 17, 2019

(51) Int. Cl.
| | |
|---|---|
| *G06F 16/00* | (2019.01) |
| *G06F 3/06* | (2006.01) |
| *G06F 12/06* | (2006.01) |
| *G06F 16/27* | (2019.01) |

(52) U.S. Cl.
CPC ............ *G06F 3/065* (2013.01); *G06F 3/067* (2013.01); *G06F 3/0619* (2013.01); *G06F 12/0646* (2013.01); *G06F 16/27* (2019.01); *G06F 2212/1032* (2013.01); *G06F 2212/657* (2013.01)

(58) Field of Classification Search
CPC ..................................................... G06F 16/27
See application file for complete search history.

(56) References Cited

U.S. PATENT DOCUMENTS

| | | | |
|---|---|---|---|
| 7,814,499 | B2 | 10/2010 | Straube et al. |
| 8,204,856 | B2 | 6/2012 | Meyer et al. |
| 9,256,598 | B1 | 2/2016 | Holt et al. |
| 9,436,407 | B1 | 9/2016 | Fan et al. |
| 9,639,589 | B1 | 5/2017 | Theimer et al. |
| 2003/0074600 | A1 | 4/2003 | Tamatsu |
| 2004/0078637 | A1 | 4/2004 | Fellin et al. |
| 2005/0289152 | A1 | 12/2005 | Earl et al. |
| 2006/0112155 | A1 | 5/2006 | Earl et al. |

(Continued)

FOREIGN PATENT DOCUMENTS

WO    WO-2006/113454    10/2006

OTHER PUBLICATIONS

Mongodb, "Resync a Backup," (Web Page), retrieved online Nov. 21, 2017, https://docs.opsmanager.mongodb.com/current/tutorial/resync-backup/.

(Continued)

*Primary Examiner* — Ajith Jacob
(74) *Attorney, Agent, or Firm* — Trop, Pruner & Hu, P.C.

(57) ABSTRACT

Examples herein relate to re-synchronizing data between an upstream volume and a downstream volume, including by communicating data to the downstream volume, from a start point to an end point of the upstream volume, maintaining a first cursor to indicate data, from the start point to the first cursor, that has been communicated to and committed to persistent storage of the downstream volume, and maintaining a second cursor to indicate data, from the first cursor to the second cursor, that has been communicated to the downstream volume and buffered without yet being confirmed as committed to persistent storage of the downstream volume.

20 Claims, 5 Drawing Sheets

(56) References Cited

U.S. PATENT DOCUMENTS

| | | | |
|---|---|---|---|
| 2007/0016754 A1* | 1/2007 | Testardi | G06F 3/0635 |
| | | | 711/206 |
| 2013/0138607 A1* | 5/2013 | Bashyam | G06F 16/178 |
| | | | 707/610 |
| 2015/0067247 A1 | 3/2015 | Rowe et al. | |
| 2016/0147855 A1* | 5/2016 | Bhagat | G06F 3/0607 |
| | | | 707/620 |
| 2017/0147669 A1 | 5/2017 | Lo et al. | |

OTHER PUBLICATIONS

Wikipedia, "Sliding window protocol," Oct. 3, 2017, <https://en.wikipedia.org/w/index.php?titie=Sliding_window_protocol&oldid=803572698>.

\* cited by examiner

DATA RESYNCHRONIZATION

BACKGROUND

Synchronous data replication between data storage volumes is a mechanism for reducing the risk of data loss in data storage as a result of a system failure. Synchronous data replication systems copy data between multiple data storage volumes. If there is disruption to communications between the systems storing the volumes, resynchronization between the volumes may be performed.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
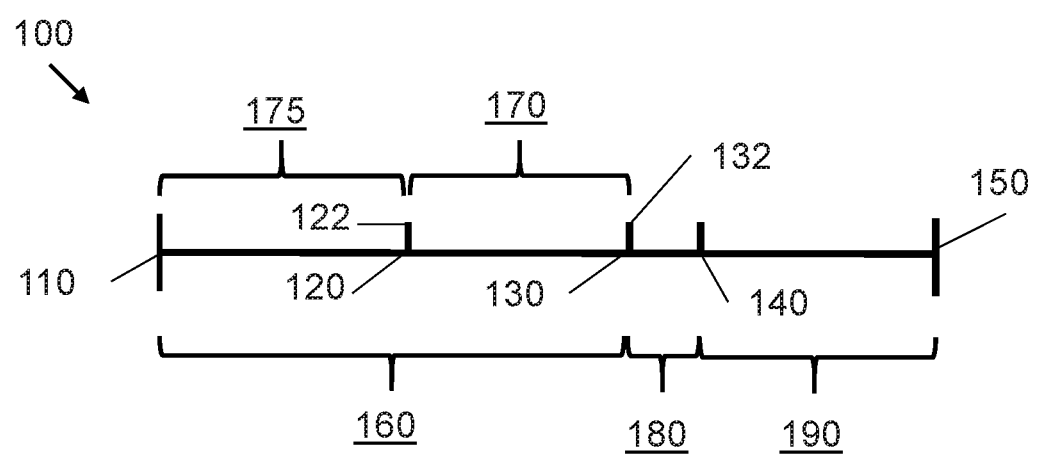
FIG. 1 is a schematic diagram of a storage volume according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to methods and systems for resynchronizing data storage volumes. A "data storage volume" as used herein is a logical storage unit that may be presented to a client or host system in which to store data. The data storage volume, which may be referred to herein as a 'volume', may have a sequential address space, for instance with storage locations stated in terms of logical block addresses. The volume may have physical storage locations in one or more physical storage device(s) that are allocated to the volume for physical storage of data. The physical storage locations and respective devices may provide 'persistent storage', in which data persists in the absence of power. Such persistent storage locations and device(s), which may for convenience be referred to herein as 'persistent storage', may include disk-based storage device(s) (e.g., hard disk drive(s) (HDDs)), solid state drive(s) (e.g., flash drive(s)), or the like, or a combination thereof. Herein "replication" or "data replication" refers to the process of copying data stored on a first volume to a second volume that is communicatively coupled to the first volume. In the context of data replication an "upstream" volume refers to the volume from which data is being copied. A "downstream" volume refers to a volume that is receiving copied data from an upstream volume.

Customers expect that their data will be readily accessible on demand. To meet these expectations providers aim to ensure that data stored on their data storage volumes is available at all times. One such method for providing high availability of data is to hold multiple copies of data in different data storage volumes. A data storage provider can then grant to their customers access to their data across multiple data storage volumes without compromising performance. Replication of data across multiple volumes provides a greater assurance of data integrity for customers in the event of a system failure.

When performing synchronous replication, when a user performs a write operation to a segment of an upstream volume, which is synchronized with a downstream volume that is used to store a copy of the data held on the upstream volume, the new data is replicated to the downstream volume. In the present context, 'committed' means stored to physical storage locations in persistent storage, as opposed to being stored in a temporary buffer or cache, in advance of being stored in persistent storage.

Under certain circumstances, an upstream data storage volume may become disconnected from a respective downstream volume. This may be due to factors such as disruption to the communications between the volumes, routine maintenance of the underlying data storage hardware or software, hardware or software failure, a power cut or any other kind of interruption. In such cases the data held on the downstream volume is no longer synchronized with the upstream volume that remained online, if new data that has been committed to disk at the upstream volume, has not been replicated to the downstream volume. Consequently, the volumes may be re-synchronized with each other such that the versions of data held on the volumes are consistent, or 'in-sync', with one another. In this context, data consistency means that data may be stored to and subsequently recovered from the downstream volume Data consistency, of course, does not necessarily mean that the data is stored in the upstream volume and downstream volume, and in particular in respective persistent storage, in exactly the same physical form or format, due, for example, to possible differences in the way the data is physically stored for each volume. For example, the persistent storage for one volume, as compared with the other volume, may deploy different RAID systems, compression, encryption, and/or physical arrangements of persistent storage devices, etc.

One way of performing a re-synchronization of the volumes involves taking both volumes temporarily offline then copying new data from the upstream volume to the downstream volume. This has the unfortunate consequence that, even though a portion of the upstream volume has already been copied to the downstream volume, that portion is still offline and is thus prevented from accepting new data from the host. This is perceived as being highly inconvenient to users.

In a re-synchronization operation, at least a portion or region of the upstream volume, may be "frozen" temporarily such that no new data can be written to that portion or region of the upstream volume. That portion or region of the upstream volume may be referred to herein as a "frozen region". Making some or all of the upstream volume frozen in this manner may result in reduced performance from the perspective of the host. It is therefore desirable to endeavour to freeze a relatively small amount of the upstream volume to accepting new data requests during a resynchronization operation and to resynchronize the downstream volume, with respect to the frozen region, quickly.

Certain examples described herein provide systems and methods of resynchronizing a downstream volume with an upstream volume. The methods described herein reduce the latencies of both the resynchronization operation, and host-initiated operations, such as data write operations to the upstream volume.

According to examples herein, a pair of "cursors" are maintained to indicate respective points in the logical address space of the upstream volume. In examples in which the volumes have a sequential address space, for instance with storage locations stated in terms of logical block addresses, the locations of the cursors and/or the points they indicate in the volumes may be represented as logical block address offsets from the start, or another determined starting point, of the volume, which will be referred to generally herein as a 'start point'.

FIG. 1 is a simplified schematic diagram of an address space 100 of an illustrative upstream volume during a resynchronization operation according to an example. FIG. 1 shows a start point 110, corresponding to the lowest logical address from which the resynchronization operation begins, and an end point 150, corresponding to the highest logical address at which the resynchronization operation ends. As has been described, the start and/or end points may be the actual start and/or end points of the volume or points within the volume that are designated as start and end points for the purposes of the resynchronization operation.

A first intermediate point 120, after (e.g., forward or in advance of) the start point 110, represents the location of the first cursor 122. The first cursor 122, during a resynchronization operation, moves sequentially across the logical address space of the upstream volume from the start point 110 to the end point 150. In particular, the first cursor 122 indicates data of the upstream volume which was sent to the downstream volume and has been committed to persistent storage at the downstream volume. As an example, the first cursor 122 may specify a position 120 in the logical address space of the upstream volume to indicate that data stored before the first cursor 122 in the logical address space of the upstream volume (i.e., data from the start point 110 and to the first intermediate point 120) was previously sent to the downstream volume and has been committed to persistent storage of the downstream volume. The first cursor 122 may be referred to herein as a "committed downstream" cursor. The first cursor 122 advances in the logical address space of the upstream volume as the respective data that has been communicated to the downstream volume is committed to persistent storage thereof (e.g., in response to a notification that the data has been committed at the downstream volume).

A second intermediate point 130, after (e.g., forward or in advance of) the first intermediate point 120, represents the location of the second cursor 132. The second cursor 132, which is ahead of the first cursor 122 in the logical address space of the upstream volume, indicates data has been sent to the downstream volume but has not yet been confirmed as committed to persistent storage at the downstream volume (e.g., via a notification that the data has been committed at the downstream volume). For instance, the data may be buffered (e.g. in other, possibly volatile, storage, as will be described) before being committed to persistent storage of the downstream volume 270. As an example, the second cursor 132 may specify a position in the logical address space of the upstream volume to indicate that data stored before the second cursor 132 (but after the first cursor 122) in the logical address space of the upstream volume was previously sent to the downstream volume but has not yet been confirmed as committed to persistent storage at the downstream volume. The second cursor 132 may be referred to herein as an "uncommitted downstream" cursor. The second cursor 132 advances in the logical address space of the upstream volume as the respective data is communicated to the downstream volume.

The movement of the cursors is such that the second cursor 132 will typically remain ahead of the first cursor 122 during resynchronization. The exceptions are if communication of data to the downstream volume stalls for some reason or at the end of the resynchronization. In each case, the first cursor 122 will catch up with the second cursor 132. The first cursor 122, however, will not overtake the second cursor 132, as a situation will not arise in which more data has been committed than has been communicated.

A region identified as 160, from the start point 110 to the second cursor 132 at point 130, which may be referred to herein as the 'in-sync' region, corresponds to the region of the upstream volume in which all data has been communicated to the downstream volume.

A region identified as 170, which is a higher-addressed subset of the in-sync region 160, corresponds to the region of the upstream volume, which has been communicated to the downstream volume but has yet to be confirmed as committed (i.e., is still buffered) at the downstream volume, as will be described. The region identified as 170 may be referred to as the "uncommitted downstream" region.

In contrast, a region identified as 175 represents the remaining, lower-addressed subset of the in-sync region 160, and corresponds to the region of the upstream volume, which has been communicated to and committed to persistent storage at the downstream volume. The region identified as 175 may be referred to herein as the "committed downstream" region.

A region identified as 180, after (i.e., in advance of) the in-sync region 160 in the logical address space, which is bounded by the second cursor 132 at point 130 and a subsequent point 140, corresponds to the frozen region of the upstream volume, which is currently being resynchronized at the downstream volume.

A region 190, after (i.e., in advance of) the frozen region 180 in the logical address space, from the point 140 to the end point 150, corresponds to an out-of-sync region (i.e., yet to be resynchronized region) of the upstream volume.

In examples described herein, the implementation of two cursors at the upstream volume is such that the frozen region may remain relatively small, thereby reducing the latency and improving the performance of host write requests during a resynchronization operation. In some examples, data may be sent to the downstream volume rapidly, as the second cursor 132 may continue to be advanced through the logical address space of the volume (i.e. such that more data is sent to the downstream volume as part of the re-synchronization operation) without waiting for previously sent data to be committed to persistent storage at the downstream volume.

As will be explained, with reference to examples herein, any new write requests that arise during a resynchronization operation, and that are intended for the upstream volume, may be committed to the upstream volume where the request is to write data to the in-sync region 160 or to the out-of-sync region 190 but not when a request is intended to write data to the frozen region 180.

Figure 2:
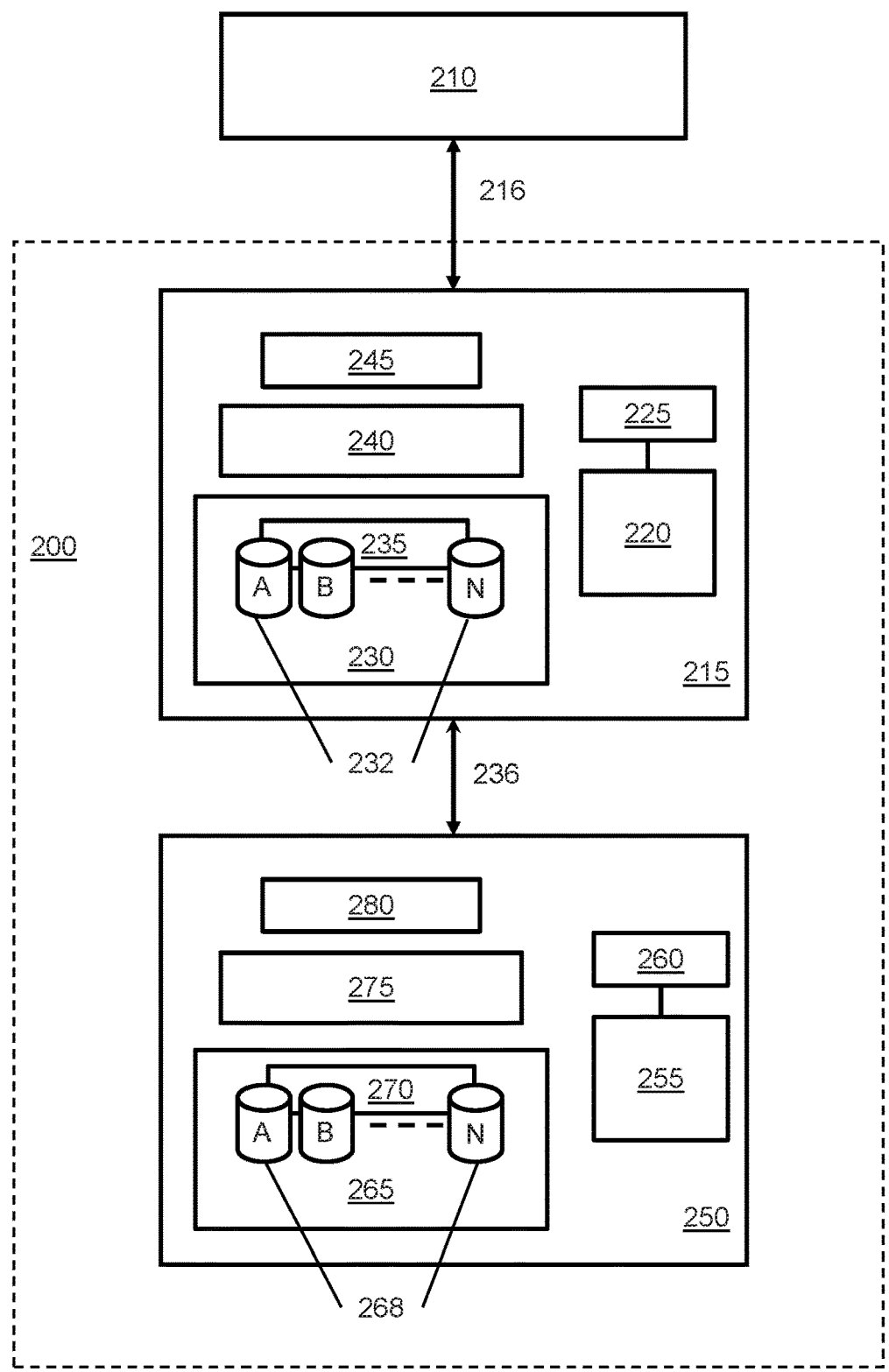
FIG. 2 is a schematic diagram of a data storage system according to an example.

FIG. 2 is a simplified schematic diagram of a data storage system 200, comprising a first storage apparatus 215 and a second storage apparatus 250, and a host system 210. The host system 210 is communicatively coupled to the first or 'upstream' storage apparatus 215, which may be a storage array. In FIG. 2 the host system 210 may be a computing device, such as a user's personal computer or a shared networked server or the like, which is communicatively coupled for data transfer to the first storage apparatus 215, via, for example, a network 216.

The first storage apparatus 215 comprises an apparatus controller 220, arranged to manage operations of the first storage apparatus, based on a program, comprising computer-readable instructions, which is stored in storage 225 and read and executed by the controller 220 to control the operation of first storage apparatus according to examples herein. According to examples described herein, the controller 220 may be a general purpose programmable processor. The storage 225 may be included in any machine-readable storage medium, which may be any electronic, magnetic, optical, or other physical storage apparatus to contain or store information such as executable instructions, data, and the like. For example, any machine-readable storage medium described herein may comprise any of volatile memory (e.g., Random Access Memory (RAM)), non-volatile memory, flash memory, a storage drive (e.g., a hard disk drive (HDD), a solid state drive (SDD), etc.), any type of storage disc (e.g., a compact disc, a DVD, etc.), or the like, or a combination thereof. In some examples, functionalities described herein as performed by first storage apparatus 215 or controller 220 may be performed by controller 220 executing instructions stored in storage 225.

The first storage apparatus 215 further comprises persistent storage 230, for example, comprising one or more persistent storage devices, 232A, . . . , 132N, such as disk-based storage device(s) (e.g., hard disk drive(s) (HDDs)), solid state drive(s) (e.g., flash drive(s)), or the like, or a combination thereof, which act as persistent storage for an upstream volume 235. The persistent storage 230 may be controlled directly by the controller 220 or may be a subsystem having its own processor or controller (not shown in the present example), which controls the storage operations of the persistent storage 230 under the supervision of the apparatus controller 220.

In examples, the upstream volume 235 may be assigned to (e.g., allocated storage locations from) a part of one persistent storage device, an entire persistent storage device, or several persistent storage devices (the latter being the case shown in FIG. 2). Data that is stored in the persistent storage devices 232A, . . . , 232N may be stored in predetermined data segments. A data segment may comprise a fixed amount or unit of data and may, for example, correspond with the data in a data stripe of a RAID disk array (if the persistent storage devices are configured in that way). The stored data may have one or more data algorithms applied to it before being stored, such as compression and/or encryption algorithms, which may increase or decrease the amount of data, compared to native data (i.e. that has not had an algorithm applied to it) that is ultimately stored to the persistent storage 230. Such algorithms may be applied under the control of the system controller 220 or by a subsystem processor or controller if one is present.

The first storage apparatus 215 according to examples further comprises a first data buffer 240 and second data buffer 245. The first and second data buffers 240, 245 typically comprise hardware memory to act as temporary data stores, which hold data before it is transmitted elsewhere in the system 200. The first data buffer 240 is communicatively coupled to the persistent storage 230. Data that is to be stored to the persistent storage 230 is received by, and buffered in, the first data buffer 240 before being committed to the persistent storage 230 under the control of the controller 220. The first data buffer 240 may comprise volatile memory such as RAM.

In an example, data in the first data buffer 240 may be committed to the persistent storage 230 in an efficient manner. For instance, the data may be committed to the persistent storage 230 when the first data buffer 240 receives a certain amount of data. In an example, the amount of data comprises at least a full segment of data that can be written as one stripe into a RAID array. In another example, data may instead be flushed from the data buffer 240 and committed to the persistent storage 230 after a fixed timeout period, for instance, even if the data buffer 240 is only partially full (or there is less than one segment of data).

The second data buffer 245 may provide a front-end buffer or cache for data that is sent from the host system 210. In one mode of operation, data is written to the second data buffer 245 before being communicated to the persistent storage 230 (via the first data buffer 240). In certain implementations, the use of a second data buffer 245 facilitates faster read/write operations between the host system 210 and first storage apparatus 215, since the data is more readily retrievable from the second data buffer 245 than from persistent storage 230. In particular, if certain data is frequently being communicated and overwritten from the host system 210 to the first storage apparatus 115, then it is preferable to write to a faster and more readily accessible memory. The second data buffer 245 may be realized as non-volatile (NV) RAM, so that host requests and the associated data stored in the second data buffer 245 are not lost in the event of a system, failure or power outage.

In some examples, the first and second data buffers, 240, 245, are realised as separate memory devices. In other examples, the first and second data buffers, 240, 245, may be realised as locations (or memory allocations) within an arrangement of one or more memory devices, comprising RAM, NV RAM or a combination thereof. In any event, the data buffers may be part of one or more data pipelines, which is or are arranged to store data to and recover data from a volume, including formatting and unformatting data (as the case dictates) by applying appropriate algorithms to the data in the process of storing or recovering data, as has been described. Such pipelines may include one or more programmed processors (e.g. acting as formatters and un-formatters, etc.) assigned specifically to the task of storing and recovering data, for instance, under the supervision of the controller 220.

The upstream volume 235 shown in FIG. 2 is represented within a single storage apparatus 215. In other examples, an upstream volume could be distributed and span one or more physical and/or virtual storage repositories.

The first storage apparatus 215 is communicatively coupled to the second storage apparatus 250 via an appropriate communication link 236, such as a network connection. According to one example, the second storage apparatus 250 comprises components similar to the first storage apparatus 215. In particular, the second storage apparatus 150 comprises a controller 255 (which may be a processor to execute instructions) coupled to storage 260 (which may be included in a machine-readable storage medium) and persistent storage 265. In some examples, functionalities described herein as performed by second storage apparatus 250 or controller 255 may be performed by controller 255 executing instructions stored in storage 260. The persistent storage 265 comprises persistent storage devices 268A, . . . , 268N, and the second storage apparatus 250 comprises first and second data buffers, 275 and 280. Similarly to the first data buffer 240 of the first storage apparatus 215, the first data buffer 275 of the second storage apparatus 250 acts as a temporary store for data that is to be committed to the respective persistent storage 265. The second data buffer 280 of the second storage apparatus 250 acts as a buffer or cache facing the first storage apparatus 215 (rather than the host 210). The controller 255 is arranged to control data operations in the second storage apparatus 250.

In FIG. 2, a downstream volume 270 is assigned to (e.g., allocated storage locations from) one or more persistent storage devices, 268A, . . . , 268N, of the persistent storage 265, and is arranged to store data synchronized from the upstream volume 235.

According to examples described herein, synchronicity between the upstream and downstream volumes, 235, 270, is maintained by replicating data, which is received from the host system 210 at the upstream volume 235, to the downstream volume 270.

Figure 3:
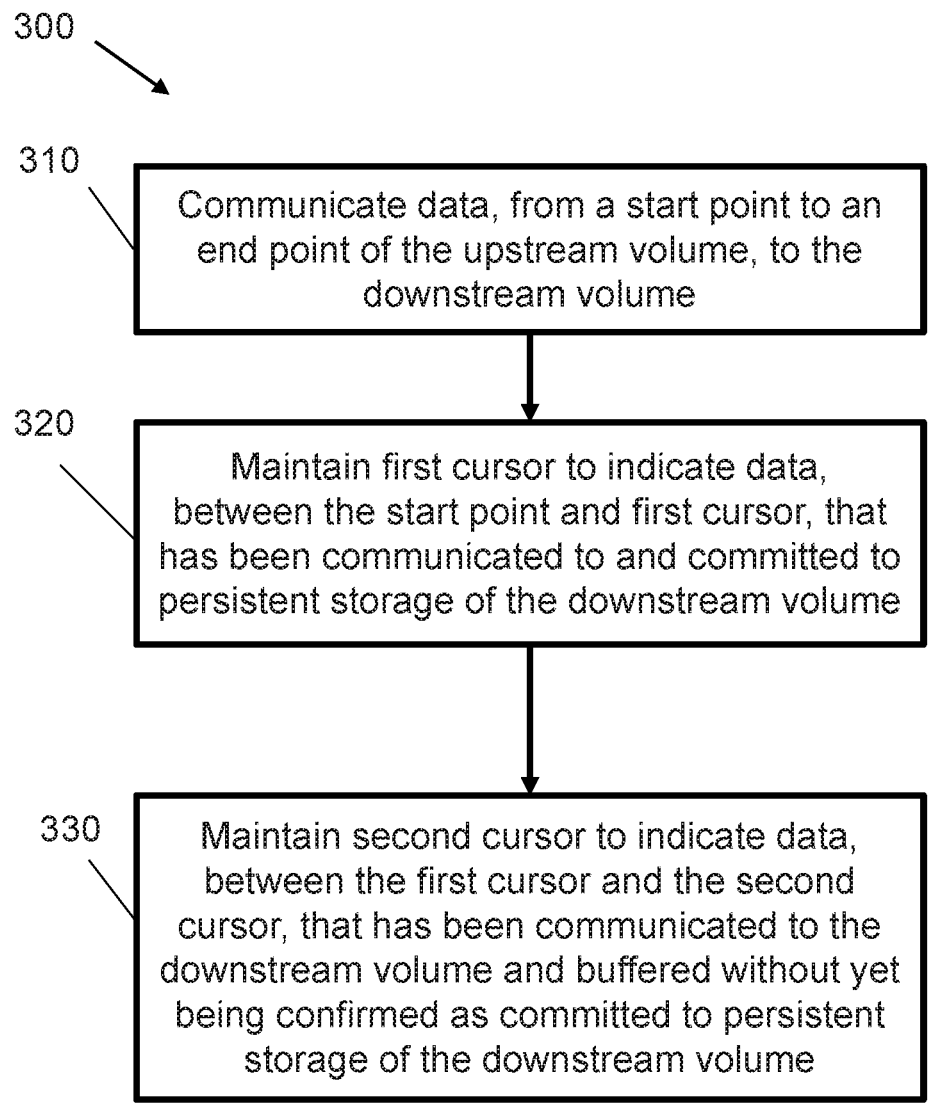
FIG. 3 is a flow chart of a method of resynchronization according to an example.

FIG. 3 illustrates a method 300 of resynchronizing data storage volumes according to an example. As described herein, for instance due to temporary loss of communications, the data stored on the downstream volume 270 may become unsynchronized with the data held on the upstream volume 235. The method 300 is implemented on the data storage system 200 shown in FIG. 2. When the method 300 is implemented on the system 200, the data that is stored in the downstream volume 270 is re-synchronized with the data that is stored in the upstream volume 235. In some examples, the method 300 may be performed by controller 220 of first storage apparatus 215 (e.g., controller 220 executing instructions stored in storage 225).

In the following description, each cursor may comprise data stored in memory to indicate a logical position in the upstream volume 235. According to examples, the controller 220 of the first storage apparatus 215 stores and maintains the first and second cursors in memory of first storage apparatus 215 (e.g., storage 225 in some examples, or other memory accessible to controller 220). Cursors are used as will be described. More generally, cursors may be stored in and be maintained by the first storage apparatus 215, the second storage apparatus 250, or in any other, separate controlling apparatus.

At block 310 of FIG. 3, starting from a start point 110 and ending at an end point 150 of the upstream volume 235, first storage apparatus 215 may communicate data between the start point and the end point the upstream volume 235 to the downstream volume 270. In some examples, the data communicated by first storage apparatus 215 may be data representing differences between the data stored in upstream volume 235 and the data stored in downstream volume 270 (i.e., data that is no longer in-sync between them), as described in more detail below. The start point may be the lowest address, or address 0, of the upstream volume 235, if the entire volume is being re-synchronized. In other cases, the start point may be a different starting address in the volume in a case where only a portion of the volume is to be re-synchronized. The controller 220 controls the transfer of data from the upstream volume 235 to the downstream volume 270 during the re-synchronization operation. The controller 220 may be arranged to initiate a re-synchronization operation, for example, in response to detecting re-establishment of communications, or it may receive a re-synchronization instruction from a management portal or an external system (not shown), such as a monitoring or administration system, which identifies that re-synchronization is to be performed. The controller 220 instructs the retrieval of data from regions of the persistent storage devices 232 and controls the transfer of the data to the second storage apparatus 250. The data is transmitted via the communications link 236 between the first storage apparatus 215 and the second storage apparatus 250.

At block 320, a first cursor 122 is maintained in the first storage apparatus 215 by the controller 220. For example, with reference to FIGS. 1 and 2, the first cursor 122 may indicate the point 120 in the data of the upstream volume 235, after or in advance of the start point 110 of the volume, representing the committed downstream region 175, relating to data which has been communicated to the downstream volume 270 and committed to persistent storage 265 allocated to downstream volume 270 in second storage apparatus 250. The controller 220 updates the position indicated by the first cursor 122 as data is confirmed as committed to the persistent storage 265 of the downstream volume 270.

According to an example, after an acknowledgement message is received, by the first storage apparatus 215 from the second storage apparatus 250, indicating that a given amount of data (i.e. how much) has been committed to the persistent storage 265 of second storage apparatus 250 for the downstream volume 270, the controller 220 may increment or advance the first cursor 122 by the given amount in response to the acknowledgement message.

At block 330, a second cursor 132 is maintained in the first storage apparatus 215 by the controller 220. For example, with reference to FIGS. 1 and 2, the second cursor 132 may indicate a point 130 in the data of the upstream volume that partially represents the data in an uncommitted downstream region 170, which is logically positioned between the first cursor 122 and second cursor 132 (that is, the second cursor 132 is in advance of the first cursor 122, such that the first cursor 122 resides between the start point of the volume and the second cursor 132). As described above, the data in the uncommitted downstream region 170 (e.g., between the first and second cursors) has been communicated to the second storage apparatus 250 and buffered without yet being confirmed as committed to persistent storage 265 of the downstream volume 270. According to an example, when the method 300 is implemented on the data storage system 200 shown in FIG. 2, the data that is replicated to the downstream volume 270 during a resynchronization operation is communicated to the first data buffer 275 of the second storage apparatus 250 before being committed to persistent storage 265 of the downstream volume 270. Data may be communicated to the first data buffer 275 rather than via the second data buffer 280 to improve efficiency.

By using the second cursor 132, the first storage apparatus 215 is able to sustain throughput of data to the downstream volume 270, to fill the first data buffer 275 of the second storage apparatus 250 as efficiently as possible, and even before data in the uncommitted downstream region 170 (between the first and second cursors) has been committed to the persistent storage 265 of the downstream volume 270. The quicker the first data buffer 275 of the second storage apparatus 250 fills, wherein the size of the buffer 275 may be in the region of 8 MB-15 MB in some examples, although the size may vary according to the type and performance of the storage media, the quicker the data in it may be flushed and committed to persistent storage 265 of the downstream volume 270, and the quicker the first cursor 122 may again be advanced.

In this way, the frozen region 180 of the upstream volume 235 may be advanced efficiently through the upstream volume 235, thereby reducing latency for the host 210 and inconvenience to the user. In one example, the frozen region 180 is at least the size of a segment (for instance, corresponding with one stripe of a RAID array, as may be used in the second storage apparatus 250), so that the frozen region remains relatively small and associated data may be communicated to the downstream volume 270, and committed to persistent storage 265 thereof, in an efficient way, as described above.

In certain examples, the controller 220 uses 'locks' on the address space of a volume, relating to a portion of the upstream volume 235, to determine the frozen region 180 and to prevent new data from being written into or out of the respective persistent storage 265 by the host system 210, while that portion 180 of the upstream volume 235 is being replicated to the downstream volume 250. In effect, the controller 220 uses locks to indicate storage locations, and thereby delimit locked regions of the upstream volume, for which write requests cannot be accepted by the first storage apparatus 215. Data indicating the locks may be stored in storage 225 and updated by the controller 220 to denote movement of the frozen region 180.

Once the data in the frozen region 180 has been communicated to the second storage apparatus 250 for replication to the downstream volume 270, the controller 220 advances the frozen region 180 in the upstream volume 235 by moving the second cursor 132 to the point 140 at which the frozen region 180 has previously ended. The previous frozen region is thereby subsumed by an increasingly-large uncommitted downstream region 170 (between the first and second cursors). In some examples, the controller 220 unlocks storage locations associated with the previously-locked, frozen region and locks storage locations associated with the new frozen region 180. In examples, the process then repeats, whereby data in the upstream volume 235 associated with the new frozen region 180 can then be replicated to the downstream volume 270. In this fashion, the second cursor 132 is updated progressively through the entire volume, frozen region-by-frozen region, between the start point 110 and end point 150 of the upstream volume 235 as it is resynchronized.

According to examples, the locked region comprises one or more data segments. From the point of view of the data provider, it is beneficial to keep as large a portion of the upstream volume 235 unlocked at any given time by minimizing the size of the frozen region 180 and/or the time during which any region is locked. Then, the host system 210 can still perform write operations on the bulk of the upstream volume 235. However, since maintaining the second cursor 132 also consumes processing resources at the first storage apparatus 215, there is also a trade-off between locking a large enough portion of the upstream volume 235 such that a significant portion data may be transferred before updating the position of the second cursor 132.

In some examples, all data of the frozen region 180 in the upstream volume 235 is communicated for replication in the downstream volume 270. In other examples, only data in the frozen region 180, that is no longer in-sync with the corresponding data in the downstream volume 270, is communicated for replication in the downstream volume 270. In examples in which only changed data is communicated, the resynchronisation operation may exhibit a reduced data communication overhead, which may reduce latency by increasing the efficiency of resynchronization, and result in the frozen region 180 traversing the upstream volume 235 more quickly. In other words, the time during which any region of the upstream volume 235 is locked and unable to be written to may be reduced. The controller 220 of the first storage apparatus 215 may use differencing to determine which data is no longer in-sync and therefore is a candidate to be communicated for replication in the downstream volume.

The controller 220 may perform differencing by comparing a current state of the upstream volume 235, and, in particular, data in the frozen region 180 thereof, with a past state of the volume. In examples, the first storage apparatus 215, under the control of the controller 200, may be arranged to store prior versions (or, 'snapshots') of the upstream volume, for instance, which are captured periodically over time, in addition to maintaining a current version 235 of the upstream volume. The snapshots may be visible to users, for example, who may be able to recover past versions of data which are stored in the snapshots, or may remain as internal copies, for example, for use by the storage apparatus 215 in differencing. For a user-visible snapshot, the data therein may be a full copy captured at a point in time, which may be compressed to minimise storage overhead, so as to facilitate data recovery by the user of prior versions of the data (e.g. a document). In some examples, differencing may be performed, by the processor 220, either by comparing data in a past snapshot of the upstream volume with a current state of the data in the upstream volume or by comparing metadata related to a past snapshot of the upstream volume with metadata related to the upstream volume in its current state. According to examples herein, the first storage apparatus 215 is arranged to take a snapshot as soon as a connection with the second apparatus has been lost. That way, the first storage apparatus 215 has a view (i.e., in the form of a most-recent snapshot) of the last common point between the upstream and downstream volumes. Then, it is possible to perform resynchronization efficiently, as only data that is identified in the upstream volume as having changed (i.e. been over-written), since the connection was lost, compared to the respective data in the most-recent snapshot, is communicated to the second storage apparatus 250. In some instances, where no changes are identified as having occurred to the data of the frozen region 180 of the upstream volume, when compared to respective data (or token/hash) of the most-recent snapshot, there is no resynchronization data to be communicated to the downstream volume, and the frozen region 180, and the second cursor 130, may be advanced immediately.

Figure 4:
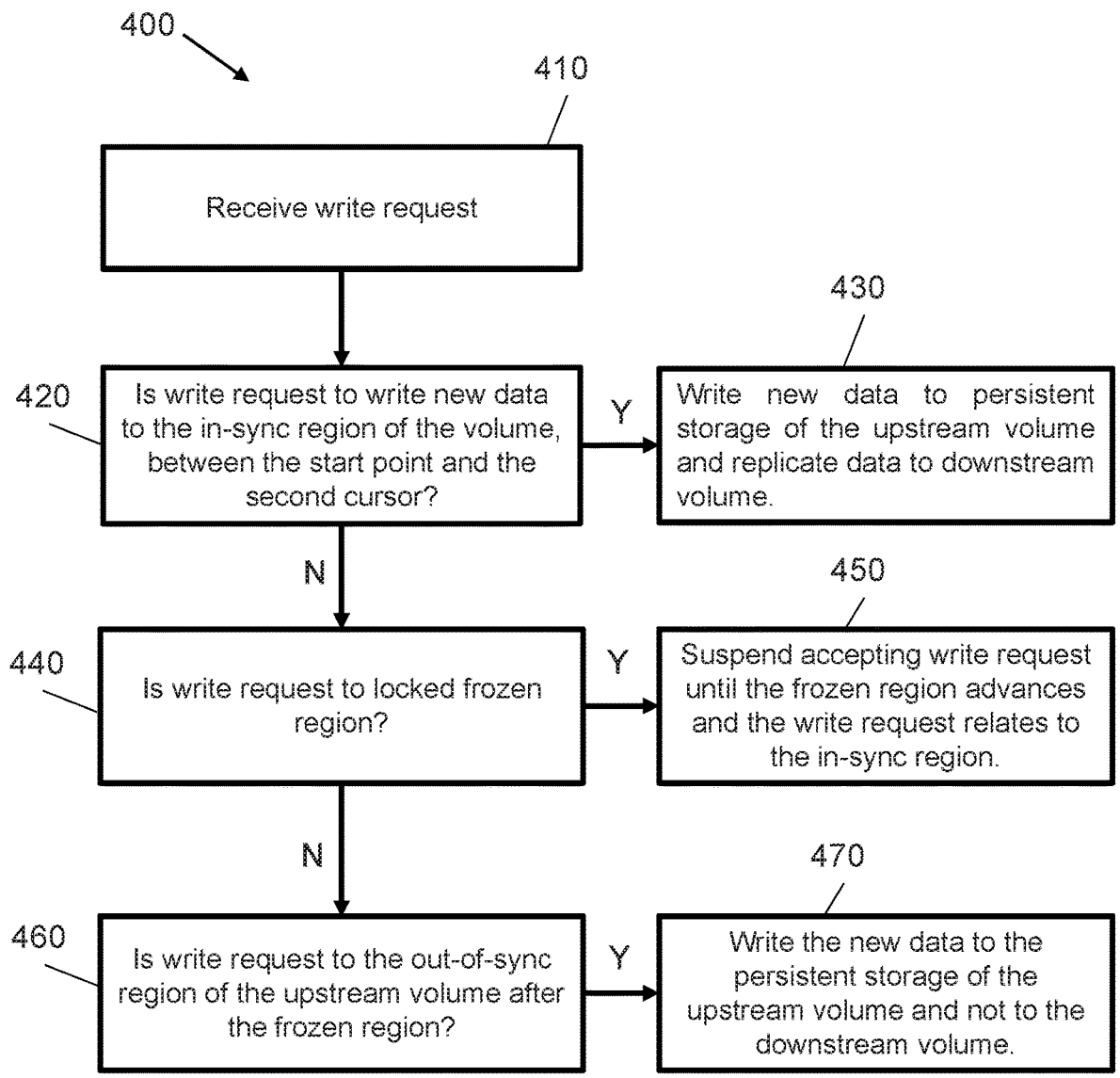
FIG. 4 is a flow chart of a method of processing data requests according to an example.

FIG. 4 shows a method 400 of processing a write request to write new data to the upstream volume 235 according to an example. The method 400 may be implemented by the controller 220 of first storage apparatus 215 (e.g., controller 220 executing instructions stored in storage 225) of FIG. 2. The method 400 may be used in conjunction with the method 300 shown in FIG. 3. In particular, the method 400 may be implemented when a resynchronization operation between an upstream volume and a downstream volume is occurring. As described in the context of the method 300, the frozen region 180 of the upstream volume 235 is prevented from receiving new data when data from that region is being resynchronized to the downstream volume 270.

At block 410, a write request is received from the host 210 by the first storage apparatus 215. The request is received at the controller 220. The new data initially may be written into the second data buffer 245 by default when it is received at the first storage apparatus 215. At block 420, the controller 220 determines if the write request is to write new data to the in-sync region 160 of the upstream volume 235, between the start point 110 and the second cursor 132.

If it is determined that the request is to write the new data to the in-sync region of the upstream volume 235, then, at block 430, the controller 220 instructs the first storage apparatus 215 to write the new data into the persistent storage 230 of the upstream volume 235 and to replicate the new data to the downstream volume 270.

At block 440, if the controller 220 determines that the write request is to the locked, frozen region 180, the data of which is in the process of being replicated to the downstream volume 270, the controller, at block 450, is arranged to suspend accepting the write request until the frozen region advances and the write request relates to the in-sync region 160.

In certain examples, the new data may be held in the second data buffer 245 until such time as the locked region becomes unlocked. At that point the new data may be committed to the persistent storage 230 of the upstream volume 235, and then replicated to the downstream volume 270.

At block 460, the controller 220 determines if the write request is to the out-of-sync region 190 of the upstream volume 235, after the frozen region 180. At block 470, if the write request is to the out-of-sync region 190, the new data is written to the persistent storage 230 of the upstream volume 235. The controller 220, in this case, however, does not instruct replication of the new data to the downstream volume 270, as all of the data in out-of-sync region 190 will be resynchronized naturally in due course as the re-synchronization operation progresses.

The blocks shown in FIG. 4 are shown as occurring sequentially. In other cases, the processing of a write request according to the blocks shown in FIG. 4 may be executed in parallel or in a different order to that shown in FIG. 4, For example, the controller 220 may determine if the write request is to the frozen region 180 first, then determine if it is to the in-sync region 160 and finally if it is to the out-of-sync region 190.

During a resynchronization operation, data that is received by the second storage apparatus 250 may be data that is being sent to resynchronize the downstream volume 270 (for instance, according to the method 300) or new data that has been written to the in-sync region 160 of the upstream volume 235 and replicated to the downstream volume 270 during a resynchronization operation (for instance, according to the method 400, block 430). A potential problem arises if new data corresponds with (i.e. relates to the same data as) resynchronized data held in the first data buffer 275. This scenario arises if the new data corresponds with data in the uncommitted downstream region 170 of the upstream volume 235, between the first and second cursors. Such resynchronized data has been communicated to the second storage apparatus 250, buffered in the first data buffer 275 thereof and, as such, has not been committed (or confirmed as committed) to the persistent storage 265 of the downstream volume 270. In such a scenario, it is important to ensure that the new data over-writes older data (e.g. that is already stored in the first data buffer 275 of the second storage apparatus 250), and not vice versa.

To ensure correct ordering of data, according to examples, the second storage apparatus 250 holds the resynchronization data in the first data buffer 275, before committing that data to persistent storage 265 of the downstream volume 270, such that data may be committed when the first data buffer 275 is full or when the buffer is only partially full but after a timeout has occurred. Meanwhile, the second storage apparatus 250 holds the corresponding new data in the second data buffer 280. The controller 255 then determines whether the new data is to overwrite data that has been buffered before being committed to persistent storage 265 of the downstream volume 270 or whether new data is to overwrite data that has been committed to persistent storage 265 of the downstream volume 270. In the former case, the controller 255 ensures that the resynchronization data in the first data buffer 275 is committed to the persistent storage 265 of the downstream volume 270 before the corresponding, new data, which is stored in the second data buffer 280, is committed to the persistent storage 265 of the downstream volume 270. Otherwise, new data may be committed to persistent storage 265 of the downstream volume 270. In this way, a correct ordering of data received by the second storage apparatus 250 is ensured during a resynchronization operation.

In examples, the second storage apparatus 250, under the control of the controller 255, may store snapshots of the downstream volume, captured periodically over time, in addition to maintaining a current version 270 of the downstream volume. Data from the first and second data buffers 275, 280, relating to resynchronization data and new data respectively, is written to persistent storage 265 of the current version 270 of the downstream buffer.

In some examples, first data buffer 275 may receive given data that is to re-synchronize certain data in persistent storage 265 of the downstream volume 270 with the upstream volume 235. In such examples, second data buffer 280 may receive, after receipt of the given data into the first data buffer 275, new data that is to overwrite the certain data in the persistent storage 265 of the downstream volume 275. In such examples, controller 255 may be or comprise a processor to execute stored instructions (e.g., stored in storage 260) to commit to persistent storage 265 of a current version of the downstream volume 270 the new data in the second data buffer 280, after the given data in the first data buffer 275 has been committed to persistent storage 265 of the current version of the downstream volume 270. In such examples, the processor may commit the given data in the first data buffer 275 and the new data in the second data buffer 280 to persistent storage 265 of a current version (or latest version) of the downstream volume 270. For example, the given data and the new data may both be committed to persistent storage 265 for a current or latest version of downstream volume 270 that is subsequent to prior snapshot(s) of downstream volume 270.

In some examples, the processor (e.g., controller 255) may execute stored instructions (e.g., stored in storage 260) to communicate an acknowledgement message to the system 215 storing the upstream volume 235, the message indicating how much data has been committed to persistent storage 265 of the current version of the downstream volume 270. In some examples, the processor (e.g., controller 255) may execute stored instructions (e.g., stored in storage 260) to communicate an acknowledgement message to the system 215 storing the upstream volume 235, the message indicating how much data has been committed from the first data buffer 275 to persistent storage 265 of the current version of the downstream volume 270.

In one case, the controller 255 implements range locks on the second data buffer 280 of the second storage apparatus 250 such that the data in the first data buffer 275 is committed to the persistent storage 265 of the second storage apparatus 250 before the new data is committed from the second data buffer 280.

In the event of a failure of the resynchronization operation at the second storage apparatus, for example due to a power outage, according to an example, the controller 220 of the first storage apparatus is programmed to recover the operation by re-starting re-synchronization from the first cursor 122, which is the point in the upstream volume 235 delimiting the committed downstream region 175 and relating to data that has reliably been committed to persistent storage 265 of the downstream volume 270. The operation does not, therefore, re-start from the start point 110 of the volume 235. In contrast, although the data in the uncommitted downstream region 170, between the first and second cursors, has also been communicated to the second storage apparatus 250, it may have been lost from the first data buffer 275 thereof (e.g. if it comprises volatile RAM), for instance, due to a power outage. For that reason, it would be unsafe to re-start resynchronisation from the second cursor 132.

According to the described examples, the methods and systems described herein are used to resynchronize data held on a downstream data storage volume with data from an upstream data storage volume. The methods described herein provide a faster resynchronization operation. The methods and systems also reduce latencies since front end write requests are always accepted for the in-sync and out-of-sync regions of the upstream volume 215.

The examples of methods and systems described herein overcome previous inefficiencies observed in resynchronization where large chunks of the upstream volume are locked out during live resynchronization operations. This is advantageous from a user perspective as latency in user reads and writes is reduced.

Figure 5:
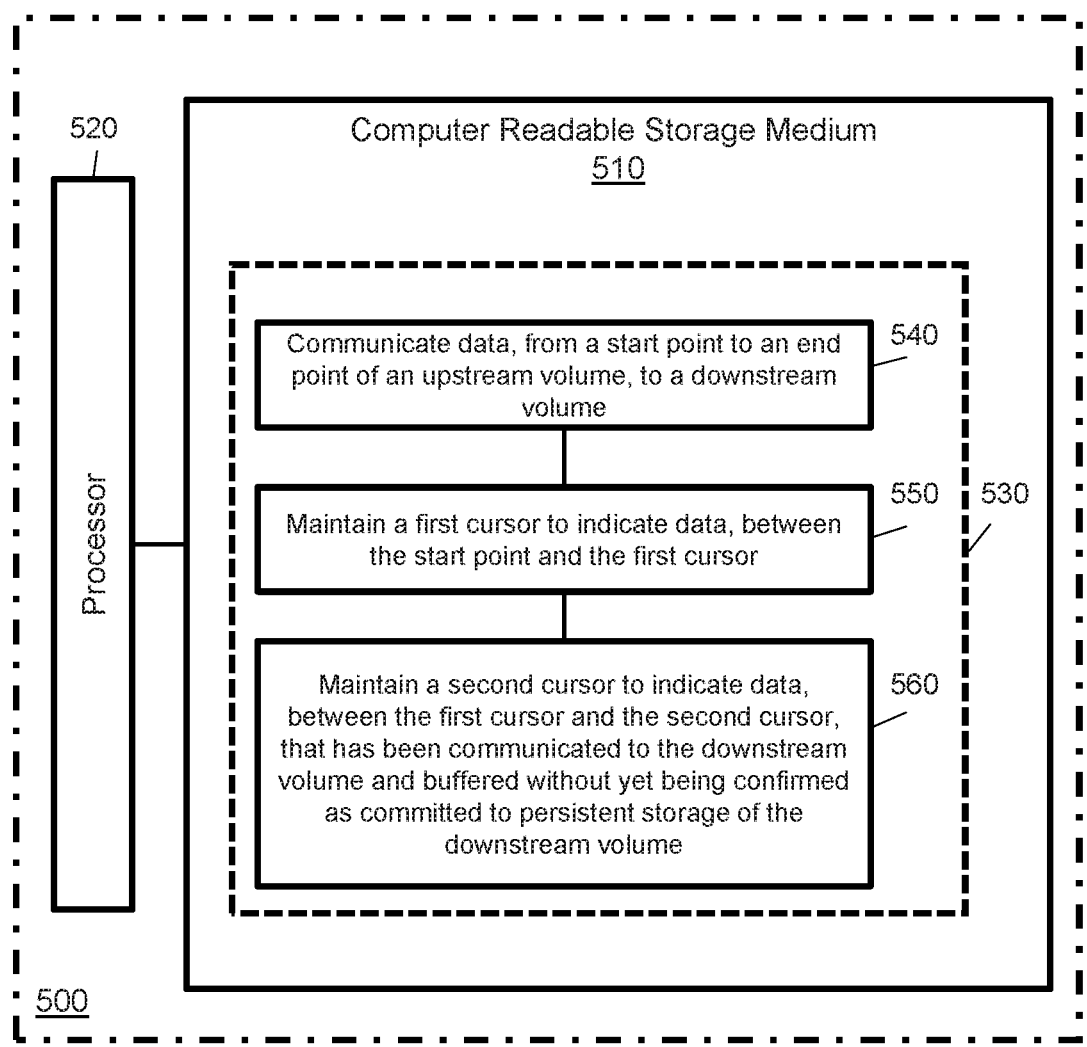
FIG. 5 is a schematic block diagram of a computer system according to an example.

FIG. 5 shows an example 500 of a device comprising a computer-readable storage medium 510 coupled to at least one processor 520. The controller 220 and storage 225 are examples of the processor 520 and computer-readable storage medium 510. The computer-readable medium 510 can be any media that can contain, store, or maintain programs and data for use by or in connection with an instruction execution system.

In FIG. 5, the computer-readable storage medium comprises program code 530, including at least instructions 540, 550, and 560. Instructions 540 are executable by processor 520 to communicate (e.g., transfer) data, from a start point to an end point of an upstream volume, to a downstream volume, as described above. Instructions 550 are executable by processor 520 maintain a first cursor 122 to indicate data, between the start point and the first cursor 122, that has been communicated and committed to the downstream volume, as described above. Instructions 560 are executable by processor 520 to maintain a second cursor 132 to indicate data, between the first cursor 122 and the second cursor 132, that has been communicated and buffered without yet being confirmed as committed to persistent storage of the downstream volume.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

The invention claimed is:

1. A method of re-synchronizing data between an upstream volume and a downstream volume, comprising:
communicating data to the downstream volume, from a start point to an end point of the upstream volume;
maintaining a first cursor to indicate data, from the start point to the first cursor, that has been communicated to and committed to persistent storage of the downstream volume;
maintaining a second cursor to indicate data, from the first cursor to the second cursor, that has been communicated to the downstream volume and buffered without yet being confirmed as committed to the persistent storage of the downstream volume; and
processing a write request to perform a write operation to the upstream volume, comprising:
if the write operation is to write new data to the upstream volume between the start point of the upstream volume and the second cursor, writing the new data to persistent storage of the upstream volume and communicating the new data to the downstream volume to be replicated at the downstream volume;
if the write operation is to write the new data to a region of the upstream volume that is locked from accepting write requests, suspending the write operation; or
if the write operation is to write the new data to a region of the upstream volume after the second cursor and that is not locked from accepting write requests, writing the new data to the upstream volume and not communicating the new data to the downstream volume to be replicated in response to the write request.

2. The method of claim 1, comprising:
receiving an acknowledgement message indicating that an amount of data buffered in the downstream volume has been committed to the persistent storage of the downstream volume; and
advancing the first cursor by the amount, to indicate that the amount of data has been committed to the persistent storage of the downstream volume.

3. The method of claim 1, comprising:
advancing the second cursor by an amount representing an amount of data that has been communicated to the downstream volume.

4. The method of claim 1, comprising, determining that the new data that is communicated to the downstream volume is to overwrite data that has been committed to the persistent storage of the downstream volume, and committing the new data to the persistent storage of the downstream volume.

5. The method of claim 1, comprising:
determining that the new data that is communicated to the downstream volume is to overwrite buffered data that has been buffered without yet being confirmed as committed to the persistent storage of the downstream volume; and
committing the buffered data to the persistent storage of the downstream volume before committing the new data to the persistent storage of the downstream volume.

6. The method of claim 1, comprising re-starting the re-synchronizing from a first position in an address space of the upstream volume in response to a failure of the re-synchronizing, wherein the first position in the address space of the upstream volume is specified by the first cursor.

7. A non-transitory computer-readable storage medium comprising instructions to re-synchronize data between a first data storage volume and a second data storage volume, wherein the instructions upon execution cause a system to:
communicate data to the second data storage volume, from a start point to an end point of the first data storage volume;
maintain a first cursor to indicate a first data portion that has been communicated to and committed to persistent storage of the second data storage volume, the first cursor specifying a first position in an address space of the first data storage volume to indicate the first data portion stored before the first position in the address space of the first data storage volume; and maintain, based on the communication of data to the second data storage volume, a second cursor to indicate a second data portion that has been communicated to and buffered without yet being confirmed as committed to the persistent storage of the second data storage volume, the second cursor specifying a second position in the address space of the first data storage volume to indicate the second data portion stored after the first position and before the second position in the address space of the first data storage volume.

8. The non-transitory computer-readable storage medium of claim 7, wherein the instructions upon execution cause the system to advance the second cursor by an amount representing an amount of data that has been communicated to the second data storage volume.

9. The non-transitory computer-readable storage medium of claim 7, wherein the instructions upon execution cause the system to advance the first cursor by an amount representing an amount of data that has been committed to the persistent storage of the second data storage volume, the advancing of the first cursor being in response to receipt of a respective message indicating the amount of data that has been committed.

10. The non-transitory computer-readable storage medium of claim 7, wherein the instructions upon execution cause the system to process a write request for a write operation to the first data storage volume, and wherein the processing of the write request comprises:
  if the write operation is to write new data to the first data storage volume between the start point and the second cursor, writing the new data to the first data storage volume and communicating the new data to the second data storage volume to be replicated at the second data storage volume;
  if the write operation is to write the new data to a region of the first data storage volume that is locked, suspending the write operation; or
  if the write operation is to write the new data to a region of the first data storage volume after the second cursor and that is not locked, writing the new data to the first data storage volume and not communicating the new data to the second data storage volume to be replicated at the second data storage volume.

11. The non-transitory computer-readable storage medium of claim 7, wherein the instructions upon execution cause the system to, in response to a failure of the re-synchronizing, re-start the re-synchronizing from a location of the first cursor.

12. The method of claim 1, wherein the data that has been communicated to and committed to the persistent storage of the downstream volume is first data, and the data that has been communicated to the downstream volume and buffered without yet being confirmed as committed to the persistent storage of the downstream volume is second data,
  wherein the first cursor specifies a first position in an address space of the upstream volume to indicate the first data stored before the first position in the address space of the upstream volume, and
  wherein the second cursor specifies a second position in the address space of the upstream volume to indicate the second data stored after the first position and before the second position in the address space of the upstream volume.

13. The method of claim 2, wherein the advancing of the first cursor comprises advancing a value of the first cursor sequentially across an address space of the upstream volume.

14. The method of claim 1, further comprising:
  storing the first cursor and the second cursor in a memory of a first storage apparatus including the upstream volume,
  wherein the downstream volume is in a second storage apparatus coupled over a network to the first storage apparatus.

15. The non-transitory computer-readable storage medium of claim 7, wherein the instructions upon execution cause the system to:
  set a lock in the address space of the first data storage volume, the lock defining a frozen region in the address space of the first data storage volume; and
  prevent a write to the frozen region.

16. The non-transitory computer-readable storage medium of claim 15, wherein the instructions upon execution cause the system to:
  responsive to communicating data in the frozen region to the second data storage volume, update the lock to move the frozen region in the address space of the first data storage volume.

17. The non-transitory computer-readable storage medium of claim 16, wherein the instructions upon execution cause the system to further:
  responsive to communicating the data in the frozen region to the second data storage volume, advance the second cursor.

18. The non-transitory computer-readable storage medium of claim 15, wherein the frozen region is after the second position in the address space of the first data storage volume.

19. A data storage apparatus comprising:
  a persistent storage to store an upstream volume;
  a memory; and
  a processor to:
    communicate data to a downstream volume, from a start point to an end point of the upstream volume;
    maintain a first cursor in the memory to indicate a first data portion, from the start point to a first position specified by the first cursor, that has been communicated to and committed to persistent storage of the downstream volume, wherein the first position specified by the first cursor is in an address space of the upstream volume, and the first data portion is stored before the first position in the address space of the upstream volume; and
    maintain a second cursor in the memory to indicate a second data portion, from the first position specified by the first cursor to a second position specified by the second cursor, that has been communicated to the downstream volume and buffered without yet being confirmed as committed to the persistent storage of the downstream volume, wherein the second position specified by the second cursor is in the address space of the upstream volume, and the second data portion is stored after the first position and before the second position in the address space of the upstream volume.

20. The data storage apparatus of claim 19, wherein the processor is to:
  set a lock in the address space of the upstream volume, the lock defining a frozen region in the address space of the upstream volume;
  prevent a write to the frozen region; and
  responsive to communicating data in the frozen region to the downstream volume:

update the lock to move the frozen region in the address
   space of the upstream volume, and
advance the second cursor.

\* \* \* \* \*